May 2, 1961  H. A. GEERDS  2,982,566
FIFTH WHEEL

Filed April 27, 1959 3 Sheets-Sheet 1

INVENTOR
HENRY A. GEERDS
BY Price & Henevald
ATTORNEY

May 2, 1961 H. A. GEERDS 2,982,566
FIFTH WHEEL
Filed April 27, 1959 3 Sheets-Sheet 2

INVENTOR
HENRY A. GEERDS
BY Price & Heneveld
ATTORNEY

United States Patent Office 2,982,566
Patented May 2, 1961

2,982,566
FIFTH WHEEL

Henry A. Geerds, Holland, Mich., assignor to Holland Hitch Company, Holland, Mich., a corporation of Michigan Filed Apr. 27, 1959, Ser. No. 809,255

3 Claims. (Cl. 280—435)

This invention relates to fifth wheels. More particularly, it relates to an improved king pin engaging assembly for fifth wheels.

It is conventional practice to couple a truck trailer to a truck or tractor therefor by means of a locking pin or king pin and a so-called fifth wheel. Normally the king pin is carried on the underside of the front portion of the trainer while the fifth wheel is mounted on top of the back frame of the tractor. The fifth wheel generally comprises a main plate which supports the front end of the trailer and a king pin engaging assembly. A typical example of fifth wheel and one on the basis of which this invention is an improvement is shown and described in U.S. Patent No. 2,348,977 to Henry Ketel.

The king pin engaging assembly usually comprises king pin coupling means and locking means for holding the coupling means in king pin coupling position. With the locking means in unlocked position the king pin is usually moved in and out of the king pin engaging assembly by backing the tractor into position under the trailer and by moving the tractor forward from the trailer.

A disadvantage of previous types of king pin engaging assemblies resides in the rather complex structures and, hence, the large number of working parts involved. It is axiomatic that the greater the number of working parts in a structure the greater are the chances of failure and the greater is the cost of manufacture.

Another major disadvantage of previous types of king pin engaging assemblies is that they will couple and lock on an improperly seated king pin. If, for one reason or another, the king pin enters the fifth wheel at too high an elevation relative to the king pin engaging assembly while the tractor is being backed up to the trailer, the king pin may enter the king pin engaging assembly and be coupled and locked horizontally. However, the structure of this type of king pin engaging assembly is such that the king pin may not be coupled and locked vertically. This improper coupling gives rise to a very serious and real danger that upon the tractor or trailer striking a bump in the road and the like under use conditions, the sudden downward motion of the fifth wheel relative to the king pin or the sudden upward motion of the king pin may cause the king pin to pop out of the king pin engaging assembly.

A general object of this invention is to provide an improved king pin engaging assembly.

A particular object of this invention is to improve the king pin engaging assembly over previous arrangements.

A specific object of this invention is to obtain this improvement with a simplified structure and a minimum number of working parts.

Another general object of this invention is to provide a king pin engaging assembly having structure with built-in safety features.

Another specific object of this invention is to provide a fifth wheel with means for preventing coupling and locking of the king pin thereto when it enters and seats in the fifth wheel at too high an elevation relative thereto.

These and other objects which may appear as this specification proceeds are achieved by this invention which shall be described with reference to the drawings which form a material part of the disclosure. A brief description of the drawings is as follows.

Figure 1:
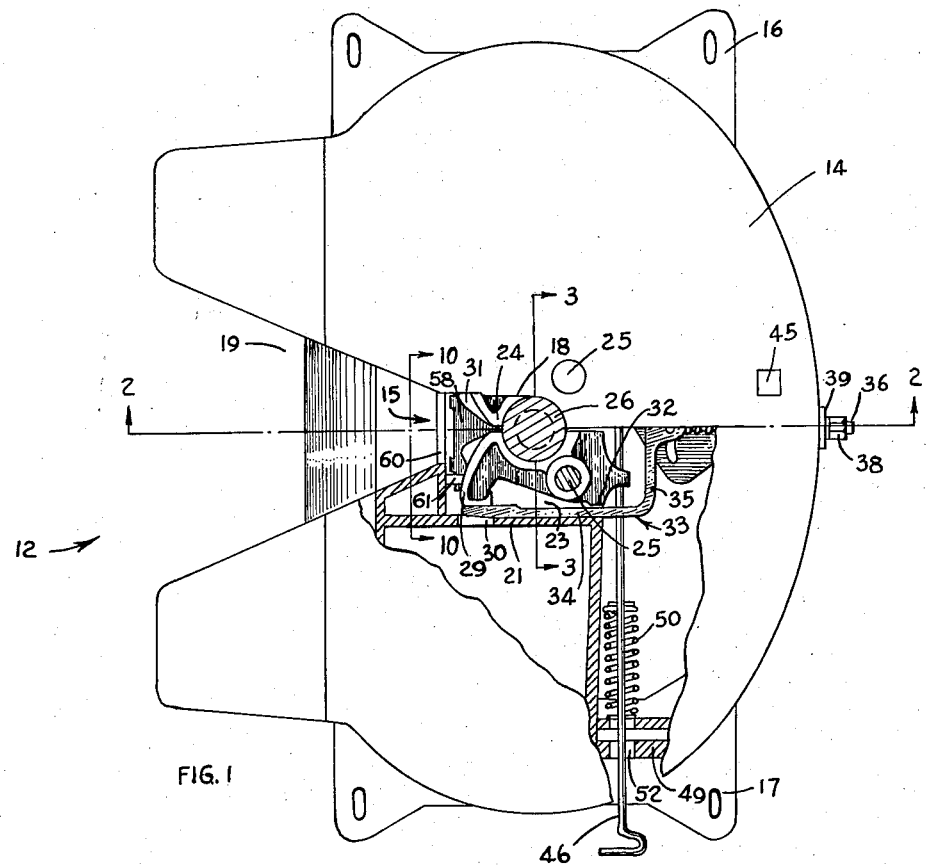
Fig. 1 is a plan view of a preferred embodiment of the improved fifth wheel of this invention, the main plate of which has been partially removed to reveal internal structure of the king pin engaging assembly.

These drawings show broadly a fifth wheel of the type taught in the Ketel patent but with certain improvements in structure and function.

One of the structural concepts generally disclosed in the drawings is a yoke retraction assembly involving a roller pin member of the yoke disposed in a transverse cam slot with an off center pocket at the unlocked position of the pin member, which slot is disposed transversely to the yoke in a cam plate pivotally mounted at one end to the main plate and secured at the other end to a release rod means. Preferably, in this assembly the yoke comprises spring means urging the yoke towards lock position and the release rod means comprises spring means which urge the release rod means into lock position.

Another structural concept generally disclosed in the drawings is that of means for preventing the king pin coupling portion of the king pin engaging assembly from closing and partially coupling a king pin disposed in the assembly at too high an elevation for being coupled against vertical movement.

Structure

The drawings specifically disclose a fifth wheel which comprises a generally horizontal main plate 14 and a king pin engaging assembly 15.

Figure 5:
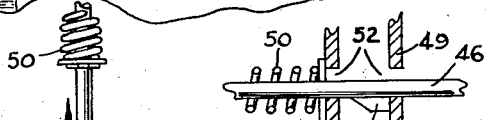
Fig. 5 is a front partially sectional view illustrating position of the outer functional release handle member of the king pin engaging assembly when the same is in the condition illustrated in Fig. 4.

The main plate 14 is mounted on brackets 16 and 17 which are normally secured to the back end of the truck or tractor. Centrally disposed in the main plate 14 is a king pin receiving slot 18 which merges into a V-shaped entrance 19. The fifth wheel will usually be mounted on the tractor so that the entrance 19 faces rearwardly of the tractor whereby, when the tractor is backed up to the trailer, the king pin can enter into the slot 18. For the purpose of simplicity in description, however, the king pin receiving end of the fifth wheel 12 will be regarded as the front end of the fifth wheel 12 so that on this basis the entrance 19 is located forwardly of the king pin receiving slot 18. The underside of the main plate 14 comprises a pair of rib members 20 and 21 disposed on each side of the slot 18 generally parallel to one another. Rearwardly of the slot 18 and secured to the bottom side of the rib members 20 and 21 is a transverse support plate 23. Along the back of the main plate 14, there is provided a downwardly extending flange member 22. Other supporting rib members such as indicated by the numeral 49 in Figs. 1 and 5 are also provided on the underside of the main plate 14.

The king pin engaging assembly 15 comprises a pair of king pin coupling jaws 24 which are pivotally mounted rearwardly of the king pin receiving slot 18 on pivot pins 25 perpendicularly mounted on and between the main plate 14 and support plate 23. Forwardly of the pivot pins 25, the king pin coupling jaws 24 are provided with semi-circular, oppositely disposed, lateral recesses and projections, which are adapted to laterally conform to the lower portion of a king pin 26 when it is at the proper height relative to the fifth wheel 12.

Figure 2:
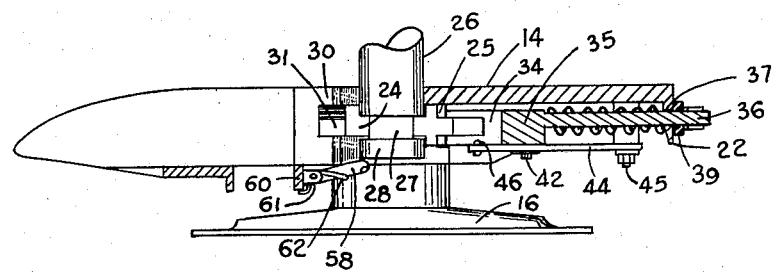
Fig. 2 is a side sectional view of the fifth wheel taken along the line 2—2 of Fig. 1.
Figure 3:
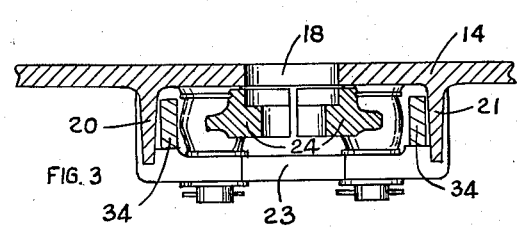
Fig. 3 is a cross sectional view taken along the lines 3—3 of Fig. 1 but with the king pin expelled from the king pin engaging assembly.

King pins are generally cylindrical in shape. However, in the region of the bottom thereof, as shown in Fig. 2, there is an annular recess 27 below which is a collar 28. When the king pin 26 is at proper height relative to the fifth wheel 12 and disposed in the slot 18 and when the jaws are in closed position the semi-circular recesses and projections of the jaws 24 will abut and hug the upper cylindrical portion of the king pin 26 and the inside of the annular recess 27. The collar portion 28 will be on the underside of the jaws 24.

Figure 4:
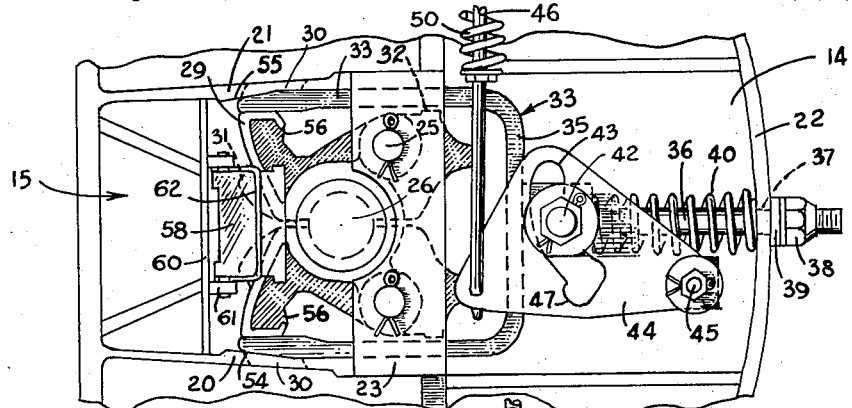
Fig. 4 is a bottom view of the central portion of the fifth wheel assembly of Fig. 1, which view displays a king pin seated in the king pin engaging assembly shown in locked condition.

Each of the jaws 24 at the forward end thereof comprises a laterally extending member or dog 29. Opposite the dog 29, the ribs 20 and 21 are provided with apertures 30 to enable the front ends of the jaws 24 to move outwardly laterally upon uncoupling a king pin 26 from the fifth wheel 12. On the forward face of each jaw 24, there is provided a forwardly extending stop member 31 which engages the forward wall of the rib adjacent the aperture when each jaw 24 opens and thereby limits the outward lateral travel of the front end of each jaw 24. Rearwardly of their pivot points the coupling jaws 24 have laterally projecting portions 32 (Figs. 1 and 4) which, in the embodiment shown, are in substantial alignment with the corresponding lateral portions of the jaw dogs 29. These rearwardly located laterally projecting portions 32 limit the extent of inner travel of the forward portion of the jaws 24. This extent at most should be the longitudinal centerline of the slot 18 and thus of the fifth wheel 12.

The king pin engaging assembly 15, in addition to the king pin coupling portion thereof, comprises a locking portion. This portion comprises a generally U-shaped yoke member 33 having generally parallel, forwardly extending leg members 34 which are positioned laterally of the jaws 24. Rearwardly of the jaws 24, the yoke 33 comprises a cross piece member 35 joined to the legs 34 and generally disposed in the same plane as the legs 34. The cross piece member 35 is also joined to a longitudinal bar member 36 disposed generally in the same plane and extending rearwardly therefrom through an opening 37 in the rear flange member 22 of the main plate 14. Rearwardly of the flange member 22 the bar member 36 is provided with threads and threadedly engaged therewith an adjusting nut 38. Between the adjustment nut 38 and the flange member 22 there is provided a resilient washer 39. Coiled about the bar 36 between the flange member 22 and the cross piece member 35 is a tension spring 40 which urges the yoke 33 forwardly. At the juncture of the bar member 36 with the cross piece member 35 of the yoke 33 and joined thereto is a downwardly extending roller pin member 42. The roller pin member 42 extends through a cam slot 43 in a cam plate 44.

The cam plate 44 is disposed generally horizontally. The rearward end thereof is pivotally secured rearwardly of the slot 43 to a pivot pin 45 carried by the main plate 14. Forwardly of the cam slot 43 the cam plate is provided with a hole for receiving a bent terminal portion of a laterally extending, release rod 46. The cam slot 43 is transversely disposed through the cam plate 44. It is arcuate in shape, having a transverse center line on an arc with its center rearwardly of the cam plate 44. Consequently, an outward pull on the release handle 46 and thus movement of the cam plate 44 causes a rearwardly directed force component to be exerted on the roller pin 42 whereby the yoke 33 is moved rearwardly against the tension of the spring 40.

The transverse cam slot 43 comprises a forwardly directed pocket 47 at the end thereof in which the yoke roller pin 42 seats when the yoke 33 is rearwardly moved. The cam slot 43 also comprises a rearwardly directed pocket 48 at that portion thereof at which the yoke roller pin 42 is positioned when the yoke 33 is in lock position.

The locking portion of the king pin engaging assembly 15 also comprises a laterally and generally horizontally disposed release rod 46. The release rod 46 extends from the cam plate 44 through passageways 52 in the outer supporting rib members 49 of the main plate 14 to one side of the fifth wheel 12. This is most clearly shown in Fig. 1. The terminal portion of the release rod 46 outside of the fifth wheel 12 has a handle portion to facilitate manual manipulation of the rod. The release rod 46, between its juncture with the cam plate 44 and its passage through the main plate supporting rib structure 49, comprises a tension spring 50 which is attached at one end as shown in Fig. 1 by conventional means to the release rod 46 and which, at its opposite end, bears against the supporting rib structure 49 to bias the release rod 46 and cam plate member 44 into lock position. The release rod 46 is also provided with a downwardly projecting stud 51 which, when the release rod 46 is in the lock position as shown in Fig. 5, abuts the inner side of the supporting rib structure wall 49 about the release rod opening 52 therethrough. The abutting face of the stud 51, it will be observed, is perpendicular to the rod 46. The other end of the stud 51 is at an oblique angle to the rod 46.

While the supporting rib members 20 and 21 on each side of the king pin receiving slot 18 of the main plate member 14 have been described as generally parallel to one another it will be observed that in the region of the apertures 30 therethrough, the inside walls thereof are thickened inwardly to form inwardly directed tapers 54 and 55. In addition, although not necessary, the front ends of the legs 34 of the yoke 33 are tapered and transversely thickened. When the yoke member 33 is in locked position, the forward ends of legs 34 thereof will bear against the tapers 54 and 55. By means of these tapers and by adjustment of the adjustment nut 38 on the end of the longitudinal rod member 36, compensation can be made for lock wear.

The rearward portion of each dog portion 29 of the jaws 24 comprises a transverse cam surface 56 having a general arc of curvature with the radial point thereof in the region of the pivot pin 25 of the corresponding jaw 24. When the king pin engaging assembly 15 is unlocked and the king pin 26 is uncoupled therefrom, the end of each of the yoke legs 34 is brought to bear against the corresponding cam surface 56 of each jaw 24. Further lateral movement of the jaws 24, due to the uncoupling action of the king pin 26, causes the jaw dog cam surfaces 56 to cam the yoke legs 34 rearwardly.

Figure 9:
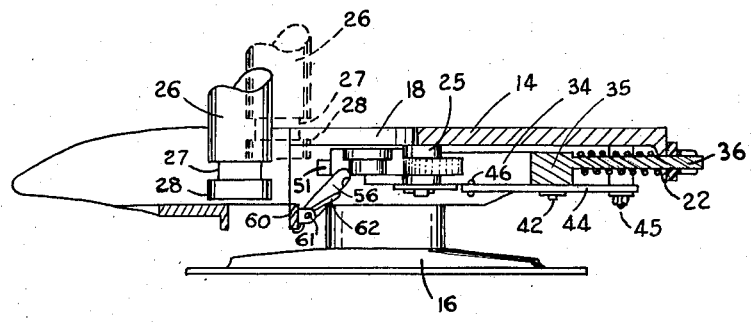
Fig. 9 is a side sectional view of the fifth wheel taken as though along the lines 2—2 of Fig. 1, but showing the king pin engaging assembly in unlocked and open condition with the king pin positioned forwardly of the assembly at the proper height for coupling and showing in phantom a king pin at too high an elevation relative to the fifth wheel for proper coupling.
Figure 10:
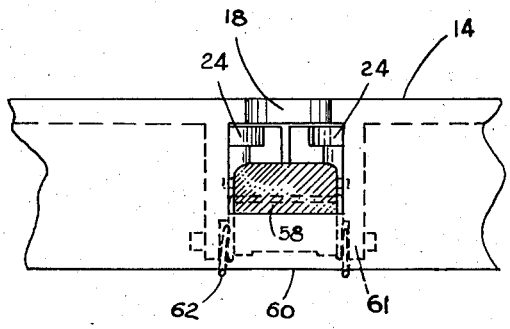
Fig. 10 is a front view of the central portion of the fifth wheel taken along the section line 10—10 of Fig. 1, but with the king pin removed and the king pin engaging assembly in unlocked and open condition.

The fifth wheel 12 is also provided with means for preventing the jaws 24 from closing when a king pin 26 enters the slot 18 at too high an elevation relative to the jaws 24. Such means comprise a spring biased, pivoted, block 58, the upper portion of which spans the gap below the inner semi-circular projection between the jaws 24 when the jaws are in fully open position and the king pin 26 is out of the slot 18 or, if it is in the slot 18, it is at too high an elevation for proper coupling. The block 58 is pivotally mounted at the lower end thereof to a crossbar 60 between and secured to the ribs 20 and 21. The lower end of the block 58 comprises a laterally extending pin on each side thereof which extends through a corresponding hole in a rearwardly projectile mounting 61 integral with the crossbar 60. The upper portion of the block 58 is supported on the crosspiece of a U-shaped spring 62 (Fig. 10), the ends of which are coiled around the corresponding laterally extending pins on each side of the lower portion of the block 58 and brought to bear against the underside of the crossbar 60 between the ribs 20 and 21. The spring 62 biases the upper portion of the block 58 upwardly into its spanning position between the jaws 24 (Fig. 9).

*Operation*

To prepare the fifth wheel 12 for receiving and for engaging a king pin 26, the following procedure is used.

Figure 6:
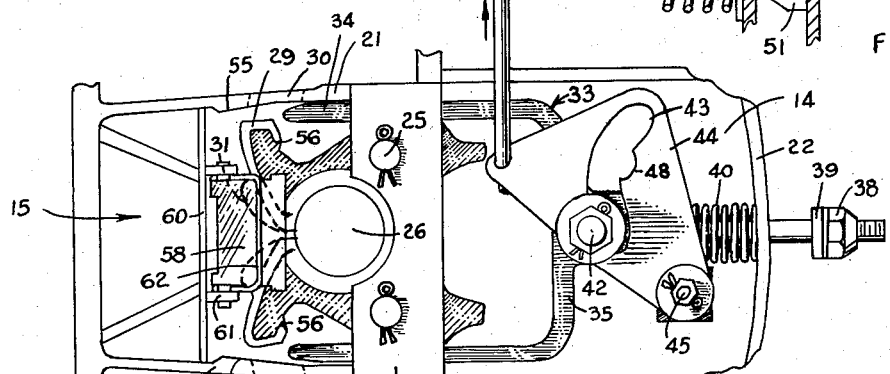
Fig. 6 is a bottom view of the central portion of the fifth wheel assembly of Fig. 4, but with the king pin engaging assembly shown in unlocked but closed condition.
Figure 7:
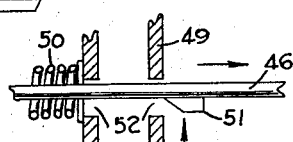
Fig. 7 is a front, partially sectioned, view showing the position of the outer functional portion of the release handle member of the king pin engaging assembly when the assembly is in the condition displayed in Fig. 6.

The handle of the release rod 46 is lifted until the stud 51 thereof is within the area of the release rod slot 52. The rod 46 is then pulled out as far as it will go. This places the stud 51 on the other side of the supporting rib 49 (Fig. 7). This causes the cam plate 44 to move laterally and thereby force the yoke roller pin 42 and thus the yoke 33 rearwardly to unlock position (Fig. 6). The yoke roller pin 42, because of the tension of the spring 40 on the longitudinal rod 36, will seat in the cam slot pocket 47. Because of the generally greater tension of the spring 40 relative to the release rod spring 50, seating of the roller pin 42 in the cam slot pocket 47 prevents the cam plate 44 and release rod 46 from returning to their initial position. The jaws 24 are now unlocked and can be opened.

The jaws 24 are opened by the withdrawing of the king pin and the jaw dogs 29 enter the apertures 30 in the supporting ribs 20 and 21. Movement of the jaws 24 into the apertures 30 and hence contact of the ends of the yoke legs 34 with the jaw dog cam surfaces 56 causes the yoke 33 to be moved rearwardly to retract position (Fig. 8), as the yoke 33 moves rearwardly the pressure of spring 40 is overcome somewhat and the pressure of spring 50 causes the yoke roller pin 42 to move from the cam slot pocket 47 and into position for movement in the cam slot 43. Because of the tension of the release rod spring 50, the release rod 46 and cam plate 44 are returned to their initial position, leaving the yoke roller pin 42 in position in the slot 43 for seating in the cam slot pocket 48. Movement of the jaws 24 into the apertures 30 to the limits imposed by the stop members 31 also releases the block 58 from its lowered position and the upper portion thereof swings up to span the gap between the now open jaws 24.

To couple a king pin 26 to the fifth wheel 12, the tractor on which the fifth wheel 12 is mounted is backed up to the trailer carrying the king pin until the king pin 26 enters the V-shaped entrance 19 of the main plate 14, and finally enters the slot 18.

If the king pin 26 is at the proper height relative to the jaws 24, that is, if the annular recess 27 is aligned with the corresponding portion of the lateral recesses of the jaws 24, as shown in Fig. 9, as the king pin 25 enters the slot 18, it knocks the block 58 down below the jaws 24 and holds it down until the king pin is withdrawn from the slot 18.

When the rear section of the recessed portions of the jaws 24 contact the king pin 26, they are compelled to move rearwardly. This causes the front portions of the jaws 24 to swing inwardly into coupling position and to close. The dog portions 29 of the jaws 24, of course, move inwardly with the jaws 24, thus causing the ends of the yoke legs 34 to slide over the jaw dog cam surfaces 56. The yoke legs 34 are thereupon free to move forwardly and, because the yoke roller pin 42 has already been unseated from the cam slot pocket 47 and because of the tension of the main spring 40, the yoke 33 automatically moves forwardly to the limit imposed by the adjustment nut 38, which limit is that whereat the legs 34 block the apertures 30 and bear against the jaws 24. This locks the jaws 24 in coupling position about the king pin 25. At the same time, because of the tension of springs 40 and 50, the cam plate 44 and release rod 46 move back to their initial position, the stud 51 on the release rod 46 slipping over the rib 49 and dropping down into abutment with the inner side thereof. The yoke roller pin 42 seats in the cam slot pocket 48 whereby, in the event of failure of the longitudinal rod spring 40, inadvertent retraction of the yoke 33 is prevented.

If the king pin 26 is at too high an elevation relative to the jaws 24, that is, if the annular recess 27 is aligned with the upper portions of the jaws 24 corresponding to the cylindrical portion of the king pin 26 above the annular recess 27, as illustrated by the king pin in phantom view in Fig. 9, as the king pin enters the slot 18, it will not knock the block 58 down below the jaws 24. Consequently, while the rear sections of the recessed portions of the jaws 24 may strike the king pin 26, the front portions of the jaws are blocked from closing by the block 58.

Figure 8:
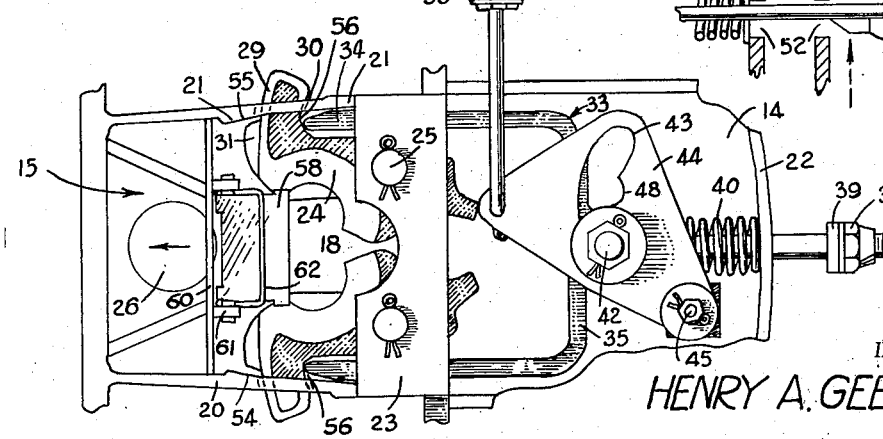
Fig. 8 is a bottom view of the central portion of the fifth wheel assembly of Fig. 6, but with the king pin engaging assembly in unlocked and open condition and with the king pin expelled.

To uncouple a king pin 26 from the fifth wheel 12, the handle on the release rod 46 is lifted until the stud 51 is within the area of the release handle passageway 52 through the supporting rib structure 49. The release rod 46 is then pulled out as far as it will go, thereby retracting the yoke 33 into unlock position, shown in Fig. 6, and unlocking the jaws 24. In this position, the yoke roller 42 becomes seated in the cam slot pocket 47. The tractor is then driven away from the trailer, thereby causing the king pin 26 to open the jaws 24 and be expelled. Opening of the jaws 24 causes further retraction of the yoke 33 to retract position because of the yoke legs 34 riding on the jaw dog cam surfaces 56. This unseats the yoke roller pin 42 from the cam slot pocket 47, as shown in Fig. 8, whereupon because of the tension of the release handle spring 50 the cam plate 44 is pivoted, bringing the yoke roller pin 42 into position for seating in the cam slot pocket 48.

Thus there is provided a fifth wheel structure in which the construction has been simplified, operation simplified, and which contains safety features.

In all respects, the king pin engaging assembly is mechanically positive and, if inoperative because of a bent king pin, provides visual evidence of incomplete coupling. This evidence resides in the position of the handle of the release rod 46 (Fig. 1) and the positions of the adjustment nut 38 and resilient washer 39.

The king pin engaging assembly of this invention cannot lock until the king pin has been encircled by the jaws. It cannot couple the king pin if the king pin is in a position too high with respect to the jaws. The engaging assembly cannot become unlocked in use except by a manual operation which starts the unlocking cycle. Every moving part of the assembly is controlled throughout the unlocking procedure and coupling procedure and is held in proper position by spring tension.

The cam slot pocket 48 with the yoke roller pin 42 seated therein functions as a secondary means for holding the king pin engaging assembly in locked position should either or both of the release rod spring 50 and the main spring 40 rupture or otherwise fail. Without the cam slot pocket 48 and under use conditions, vibration could move the yoke to unlock position in the absence of the spring forces of these springs. The cam slot pocket 48 prevents this possibility from occurring.

Moreover, the king pin engaging assembly has an adjustable feature. Extent of forward travel of the yoke 33 can be regulated by the adjustment nut 38 (Fig. 1) even when the yoke is in lock position. Further, the rubber washer 39 (Fig. 2), being resilient, provides a rebound against yoke travel, which minimizes wedging action resulting in a sticky lock. The type of adjustment involved here increases the life of the jaws by removing all chucking action.

Still another feature of advantage of the king pin engaging assembly of this invention resides in the cooperation between the yoke legs 34 and the jaws 24. Under normal operative conditions and in the absence of the block 58 or with failure of the block spring 62, the contact between the ends of the yoke legs 34 and the cam surfaces 56 on the jaw dogs 29 is sufficient because of the spring forces of the springs 40 and 50 to hold the jaws in open, king pin receiving position until a king pin enters the slot 18 and strikes the rearward portions of the jaws 24. Hence, inadvertent closure of the jaws 24 before receiving a king pin 26 is prevented. Moreover, under such conditions and in the event only the end of one leg 34 is in contact with a cam surface 56 of one jaw 24, the rearwardly located, laterally projecting portion 33 on the other jaw in combination with the corresponding leg 34 (the one out of contact with a jaw dog cam surface 56) limits the extent of inner movement of the forward portions of the jaw 24. Hence, obstruction of the king pin passage by a "loose" jaw 24 is prevented.

These and other features and advantages of this invention will be apparent to those of ordinary skill in the art upon reading the foregoing description. Moreover, this invention may be embodied in several forms without departing from the spirit or essential characteristics thereof. The embodiment just described is, therefore, illustrative and not restrictive, since the scope of the invention is defined by the appended claims rather than by the description preceding them, and all changes that fall within the metes and bounds of the claims, or that form their functional as well as conjointly cooperative equivalents, are therefore intended to be embraced by those claims.

I claim:

1. A fifth wheel comprising: a main plate having a centrally disposed, king pin receiving slot and a V-shaped entrance thereto; means for mounting said main plate on the back frame of a tractor; a king pin engaging assembly mounted on the underside of said main plate, said king pin engaging assembly comprising jaw means on each side of the space of said king pin slot, each of said jaw means having a pivot point rearwardly of said slot and being pivotable forwardly of said pivot point from coupling position in the space of said slot to open position laterally of said space of said slot, each of said jaw means having an oppositely disposed, inner, semi-circular projection corresponding to the annular recess in a king pin at the bottom end portion thereof; crossbar means mounted to said main plate between the entryway of said V-shaped entrance and the position of a normally coupled king pin in said king pin receiving slot and disposed below the normal path of travel of the bottom end of said king pin through said entrance and into said slot; block means, the upper portion of which spans the gap between said jaw means in open position and the lower portion of which is disposed forwardly of said upper portion and is pivotally connected to said crossbar means; and spring means urging said upper portion of said block means into said gap between said jaw means when said jaw means are in said open position.

2. A fifth wheel comprising: a main plate having a centrally disposed kingpin receiving slot and adapted to be mounted to the frame of a tractor; a cylindrical kingpin receiving assembly including jaws pivotally connected to said plate and having oppositely disposed concave semicylindrical surfaces corresponding to an annular recessed portion of a cylindrical kingpin; jaw control means for closing and locking said jaws on a kingpin and for allowing said jaws to remain in an open position when not in contact with a kingpin; and safety latch means independent of said jaw control means and secured to support means below said plate to assure closure of said jaws on the recessed portion of a kingpin to prevent inadvertent unhitching of the kingpin from said jaws; said safety means comprising block means pivotally secured to said support means below said jaws and upwardly biased to a position between said jaws when said jaws are open; and said block means being depressible by a kingpin to allow said jaws to close only when the annular recess in the kingpin is lowered to the plane of said jaws.

3. A fifth wheel comprising: a main plate having a centrally disposed kingpin receiving slot and adapted to be mounted to the frame of a tractor; a cylindrical kingpin receiving assembly including jaws pivotally connected to said plate and having oppositely disposed concave semicylindrical surfaces corresponding to an annular recess in a cylindrical kingpin; said jaws being adapted to close upon the annular recess of a kingpin to retain the pin; and independent safety latch means secured to support means below said plate to assure closure of said jaws on the recessed portion of a kingpin and thereby prevent inadvertent unhitching of the kingpin from said jaws; said safety means comprising block means pivotally secured to said support means below said jaws and upwardly biased to a position between said jaws when said jaws are open; and said block means being depressible by a kingpin to allow said jaws to close only when the annular recess portion of a kingpin is lowered to the plane of said jaws.

References Cited in the file of this patent

UNITED STATES PATENTS

| Number | Name | Date |
|---|---|---|
| 1,782,115 | Cadman | Nov. 18, 1930 |
| 2,385,596 | Yager et al. | Sept. 25, 1945 |
| 2,469,279 | Seyferth | May 3, 1949 |
| 2,663,575 | Ketel | Dec. 22, 1953 |
| 2,756,074 | Kayler | July 24, 1956 |
| 2,907,583 | Dalton | Oct. 6, 1959 |